UNITED STATES PATENT OFFICE.

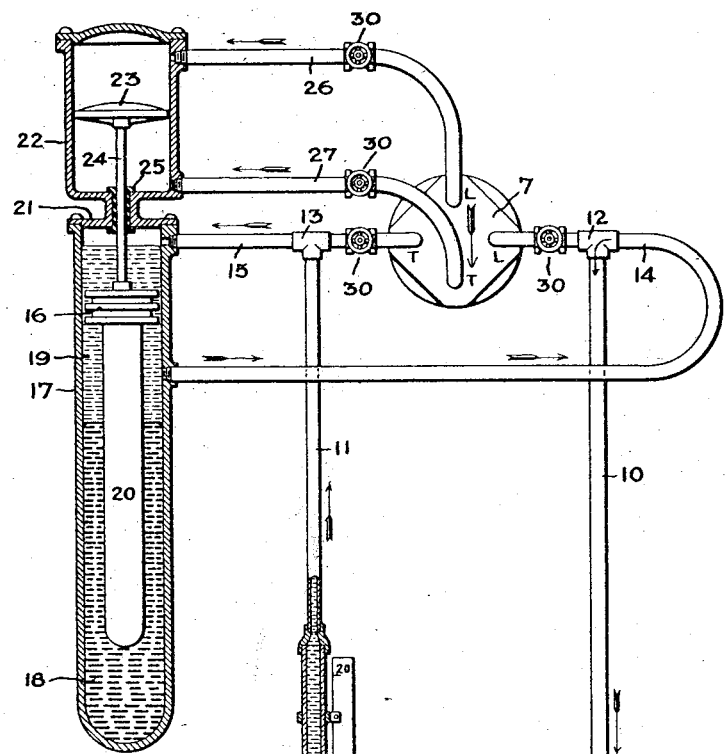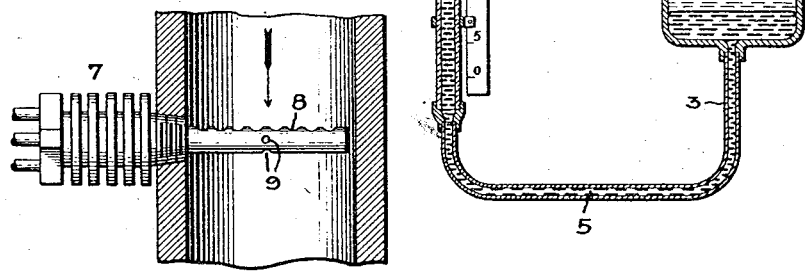

JAMES WILKINSON, OF SCHENECTADY, NEW YORK, ASSIGNOR TO GENERAL ELECTRIC COMPANY, A CORPORATION OF NEW YORK.

FLOW-METER.

1,114,563.

Specification of Letters Patent.

Patented Oct. 20, 1914.

Application filed January 14, 1914. Serial No. 811,946.

*To all whom it may concern:*

Be it known that I, JAMES WILKINSON, a citizen of the United States, residing at Schenectady, county of Schenectady, State of New York, have invented certain new and useful Improvements in Flow-Meters, of which the following is a specification.

My invention relates to flow meters, and particularly to flow meters of the U-tube mercury type for use in measuring steam or other condensable vapors. I will describe my invention as related to the flow of steam, but it will be understood that it is not necessarily so limited.

As ordinarily arranged, the U-tube of the meter is connected to the agent for creating a pressure difference which varies with the rate of flow by means of suitable pipes through which the pressures are transmitted. These pipes in the case of steam flow are preferably kept filled with water, such an arrangement being desirable for various reasons. Whenever a change in the rate of flow occurs, the water column on one side of the U-tube is lowered, while that on the other side spills over, this "spill" in the ordinary arrangement passing into the main conduit. Whenever a "spill" occurs there is a change in the relation of the static heads due to the lowering of the water column in one of the pipes, and unless special arrangements are provided this will introduce an error into the reading of the meter until such time as the pipe again becomes filled with liquid due to condensation.

The present invention has for its object to improve the operation of meters of the class described and to that end comprises a means for positively and quickly supplying such an amount of liquid to either leg of the U-tube as will compensate for that displaced by the fluid pressure as a result of a change in the rate of flow of the fluid being metered.

For a complete understanding of my invention attention is directed to the following specification wherein I have described a specific embodiment thereof.

In the drawing Figure 1 is a view, somewhat diagrammatic and partly in section illustrating my invention, and Fig. 2 is a detail view illustrating the form of pressure difference creating device shown in Fig. 1 inserted in the conduit through which the fluid being metered flows.

Referring now to Figs. 1, 3 and 4 are the leading and trailing legs respectively of a U-tube manometer. This manometer may take any approved form, the illustration in the drawing being diagrammatic in nature. The U-tube contains a body of mercury 5 and adjacent one leg, as the trailing leg for example is arranged a suitable scale 6 with which the mercury column in the trailing leg may be compared to indicate the rate of flow.

7 is a suitable agent for creating a pressure difference which bears a definite relation to the rate of flow of the fluid being metered. This agent is shown as being of the Pitot tube type and as having a set of leading orifices 8 and trailing orifices 9. My invention is not limited to this type of agent, however, but may be used with other types as well, the type illustrated being only by way of example.

Connecting the leading and trailing legs of the U-tube with the agent 7 are the pipes 10 and 11, such connections being made through suitable T couplings 12 and 13. It will be noted that the pipes 10 and 11 are connected to the agent 7 in the same horizontal plane whereby the static heads on each side of the U-tube are normally of the same height. Connected to pipes 10 and 11 by way of the T couplings 12 and 13 are the pipes 14 and 15 which lead to points respectively above and below the piston 16 in tube or reservoir 17. This tube is closed at the bottom and contains a body of heavier liquid as mercury 18 upon which rests a body of water 19, the line between the water and mercury being somewhat below the point where pipe 14 joins the tube. The piston 16 is wholly submerged in the water and is carried by the float 20 which rides on the mercury. The piston is fitted sufficiently loosely so as to move without appreciable friction.

The tube 17 is closed at the top by a cover 21, mounted upon which is the cylinder 22, having the piston 23 therein. This piston is fitted sufficiently loosely to move without appreciable friction and is connected to the piston 16 by stem 24 which passes through a suitable bushing 25 which acts also as a guide. Communicating with the cylinder 22 upon opposite sides of piston 23 are the pipes 26 and 27 which lead respectively to the leading and trailing sides of the agent 7. These connections are shown as being through openings separate from those of pipes 10 and 11 and I find this a convenient arrangement with the type of agent 7 as illustrated. It will be understood, however, that these connections may be otherwise arranged as it is only essential to the embodiment of my invention illustrated that they be arranged so as to convey the leading and trailing pressures to opposite sides of piston 23. Communication of the pipes with the agent 7 is controlled by suitable hand valves marked 30.

The operation is as follows: Assume that the meter is connected to a conduit through which steam to be metered is flowing and that with a certain rate of flow the parts are in the position as shown. Under these circumstances the water 19 in tube 17 will be at the level of the lower edge of pipe 15. The upper surface of piston 23 is subjected to the pressure on the leading side of the agent 7 through pipe 26 and the lower surface of this piston is subjected to the pressure on the trailing side of the agent 7 through the pipe 27. The upper and lower surfaces of the piston 16 are subjected to the trailing and leading pressures of the agent 7 through pipes 15 and 14 respectively. The piston 23 is larger than piston 16, however, so that the resultant is a downward pressure on piston 23 which is proportional to the pressure difference created by the agent. This downward pressure is opposed by the buoyancy of the float 20 so that piston 16 is held at some intermediate point in a state of equilibrium. If now a change in the rate of flow takes place, as for example, the rate increases, this will result in an increase in the pressure difference set up by the agent 7, whereupon the mercury and water in the leading leg will be displaced, i. e. forced downward, while that in the trailing leg will be forced upward; that is, the column of water in pipe 10 will fall while that in pipe 11 spills over as indicated by the arrows. At the same time, however, that the water in pipe 10 falls, the piston 23 will be acted upon by the increased pressure and forced slightly downward. This in turn will lower piston 16, by which movement water from the tube or reservoir 17 will be forced through pipe 14 into the pipe 10 to immediately fill the same to the highest level. At the same time the water forced from pipe 11 will pass over into the reservoir to maintain the level thereof. As will be evident any water which may be lost from the reservoir will be replaced by condensation, so that it would be immaterial if more or less of the "spill" were to pass into the conduit. Upon a decrease in the rate of flow a corresponding action, only in the opposite direction, takes place as will be obvious.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a flow meter for condensable vapors, the combination of a U-tube manometer containing a body of heavy liquid, an agent for creating a pressure difference which bears a definite relation to the rate of flow of the fluid being metered, pipes connecting the manometer and agent, said pipes normally being filled with liquid due to condensation and forming a pressure transmitting system between said agent and manometer, the pressure difference set up by said agent acting to displace liquid from one part of said system, and means for positively forcing liquid into the system when a change in the rate of flow occurs to replace the liquid displaced from the system due to such change.

2. In a flow meter for condensable vapors, a U-tube manometer, an agent for creating a pressure difference which bears a definite relation to the rate of flow of the fluid being metered, pipes connecting the manometer and agent, said pipes being filled with liquid due to condensation, and means controlled by the pressure difference set up by the agent for maintaining the pipes at all times filled with such liquid.

3. In a flow meter for condensable vapors, a U-tube manometer, an agent for creating a pressure difference which bears a definite relation to the rate of flow of the fluid being metered, pipes connecting the manometer and agent, said pipes being filled with liquid due to condensation, a reservoir containing liquid due to condensation connected to said pipes, and means for positively feeding liquid from the reservoir to the pipes to keep the same at all times filled.

4. In a steam flow meter, the combination of a U-tube manometer, an agent for creating a pressure difference which bears a definite relation to the rate of flow of the fluid being metered, pipes connecting the manometer and agent, said pipes being filled with water, a reservoir containing water connected to said pipes, and means controlled by the pressure difference set up by said agent for feeding water from said reservoir to the pipes to keep the same at all times filled.

5. In a steam flow meter, the combination of a U-tube manometer, an agent for creating a pressure difference which bears a definite relation to the rate of flow of the fluid being metered, pipes connecting the manometer and agent, said pipes being filled with water, a reservoir containing water, a piston in said reservoir, pipes connecting the first named pipes to said reservoir upon opposite sides of said piston, and means for moving said piston.

6. In a flow meter for condensable vapors, a U-tube manometer, an agent for creating a pressure difference which bears a definite relation to the rate of flow of the fluid being metered, pipes connecting the manometer and agent, said pipes being filled with liquid due to condensation, a reservoir containing liquid, a piston in said reservoir, pipes connecting the first named pipes to said reservoir upon opposite sides of said piston, a float connected to said piston upon one side, a pressure operated device connected to said piston upon the other, and means for subjecting said pressure operated device to the pressure difference set up by said agent.

In witness whereof, I have hereunto set my hand this 12th day of January 1914.

JAMES WILKINSON.

Witnesses:
HELEN ORFORD,
MARGARET E. WOLLEY.